United States Patent Office 3,052,478
Patented Sept. 4, 1962

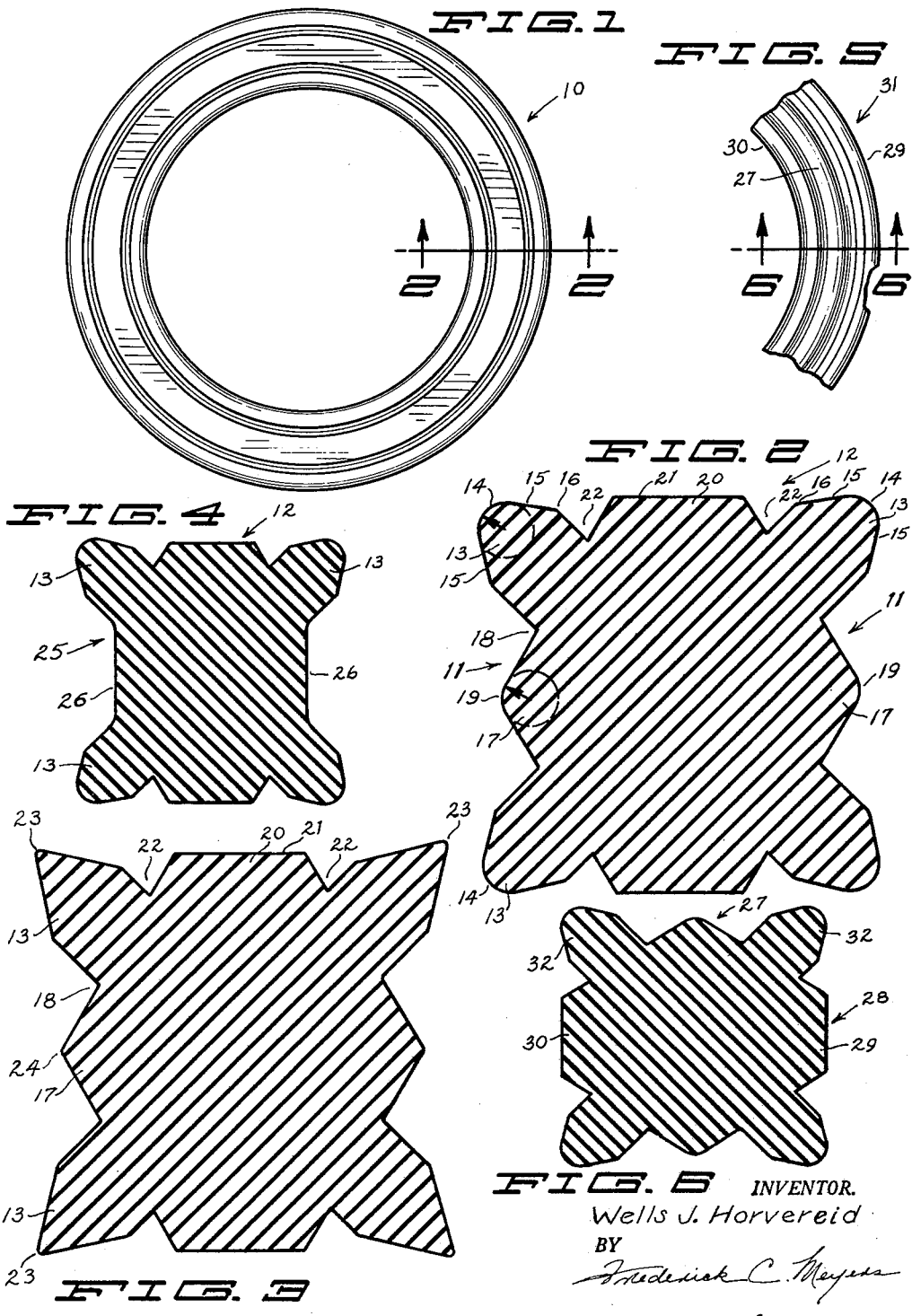

3,052,478
SEALING RING
Wells J. Horvereid, Minneapolis, Minn., assignor to Precision Associates, Inc., a corporation of Minnesota
Filed Sept. 16, 1959, Ser. No. 840,353
8 Claims. (Cl. 277—209)

This invention relates to sealing rings, and more particularly to a ring of the type having distortable and resilient characteristics.

It is an important object of the invention to provide a non-twisting resilient sealing ring which will be highly efficient under widely varying conditions of pressure and friction when confined in contacting engagement between the confronting surfaces of two members to be sealed.

Another object of the invention is to provide a resilient ring which will maintain an unusually low break-away friction for a wide range of seal-operating pressures, including low, and negative, pressures.

A further object is to provide a seal ring having desirable degrees of resilience and distortability, yet presenting static resistance which will permit the ring to seal effectively without crushing or extruding into clearances between members to be sealed.

A still further object of the invention is to provide a seal ring having well-defined side face structure functioning cooperatively to give efficient sealing and good lubrication when one face is utilized in sliding pressure contact and another side face, angulated with respect to the first, is utilized in static pressure contact.

These and other objects and advantages of my invention will more fully appear from the following description made in connection with the accompanying drawings, wherein like reference characters refer to the same parts throughout the several views and in which:

FIGURE 1 is a plan view of a seal ring embodying my invention;

FIGURE 2 is an enlarged cross section taken on the line 2—2 of FIGURE 1, the radius of curvature at the noses of the lip and rib portions being indicated by dotted line circles;

FIGURE 3 is a similar view of the cross sectional view of FIGURE 2, showing a modification of the invention wherein the nose portions are considerably sharper;

FIGURE 4 is a further modification of the invention wherein the rib portions have been eliminated while maintaining shallow recesses;

FIGURE 5 shows an arcuate segment of an alternative from of the invention, wherein the static pressure and sliding pressure at the sides of the seal ring are reversed; and FIGURE 6 is an enlarged cross sectional view of the ring segment of FIGURE 5, taken on the line 6—6.

With continued reference to the drawing and particularly to FIG. 1, my sealing ring is indicated generally at 10 and is constructed of suitable material such as synthetic rubber which is resilient and distorable within limits to maintain an effective seal under both high and low pressures. The special seal which I have developed not only maintains the excellent seal under purely static conditions, but also under dynamic conditions provides low friction, both at the breakaway point and under high speed frictional contact, and resists spiral twisting and extrusion where ordinary ring seals would fail.

The seal ring 10 has an annular internal body which, in cross-section, is solid as typified by the views of FIGS. 2, 3, 4 and 6. It will be noted that the cross-sectional appearance is generally rectangular, which minimizes the amount of natural distortion which occurs during usage. It has been observed that conventional O-rings of circular cross-section tend to flatten and distort into cornered configuration under extreme conditions of pressure and commonly become "Compression-set."

Broadly speaking my ring 10 has contiguous faces, each of which are adapted to become, or remain, under pressure and seal primarily at the corners. The corners are backed-up by intermediate structure which, in most cases, is humped and have a protective bumping and secondary sealing action and the intervening positions define shallow grooves or troughs capable of carrying lubricant and tending to close under pressure. In no event, however, are the grooves or troughs of such dimensions as to permit crushing of the corner members. The function of the corner members is that of sealing and, to this end, are maintained thin and flexible. Where the function of the humped structure is predominantly that of bumpering to protect the corners against crushing and extrusion, the humped portion is formed relatively thick and firm. Where the function is predominantly that of assisting the corners in sealing, then the humped portion may be less thick and firm and in some instances may be flattened to virtual extinction, it being understood that the recess formed thereby is wider but not of a depth which will permit the corners to fold and crush.

With the foregoing in mind, my ring 10 may be provided with two types of contiguous faces, as shown in FIG. 2, one being a sliding pressure side 11 and the other being a static pressure side 12. These pressure sides 11 and 12 are angulated with respect to one another and are generally at a full 90°, although it is to be understood that my invention is applicable to situations where sliding and static sides are not normal to one another. The static side 12 is subjected to straight compressive force during use, the ring being carried in conventional manner by a member (not shown) against which it is adapted to press. The sliding pressure side 11 is adapted to exert a pressure against a relatively moving surface (not shown) and is subjected not only to compressive force but also to frictional forces and combined forces created by general distortion of the sealing ring body.

The sliding pressure side 11 has a pair of corner-positioned sealing lips 13 which are narrow and flexible and terminate outwardly in respective noses 14, as shown. Each of the noses 14 is provided with sides 15 which may be somewhat rearwardly divergent in order to insure that the forward terminus has proper flexibility without breaking down the remaining portions of the lip. I find it convenient to stop the divergence of sides 15 at points 16, which then define bulges or heels as shown. The divergent sides 15 are so angulated that the heel points 16 never engage or rub against a surface to be sealed unless the entire side 15 is caused to engage the surface. Leakage, despite low friction, is thus prevented. In the form of the invention shown in FIG. 1, the sliding pressure side 11 is also provided with a humped portion such as rib 17 formed intermediate the corner-positioned sealing lips 13 and defines, with the lips 13, an intervening pair of shallow grooves 18 which are of such a nature as to retain lubricating fluid while not presenting such a pronounced recess as would structurally weaken the ring body. The rib 17 is provided with a nose 19 which may conveniently have the same rate of curvature at its outermost portion as the noses 14 of the corner-positioned sealing lips 13. I also find it useful to form the rib 17 somewhat inwardly from a line drawn through the outermost portions of the corner-positioned sealing lips so that, druing use, the rib will not produce frictional drag unless and until the corner-positioned flexible lips are distorted sufficiently to bring the nose 19 of rib 17 into initial contact with a sliding surface. When the ring is installed between surfaces to be sealed, the lips 13 are distorted slightly in order to insure good contact at no pressure or at low pressures. The friction is very low because of the light contact and small areas at the nose portions 14. If the ring continues to distort under diametral squeeze as pressures are increased, rib 17 will begin to join the lips 13 in contacting a surface to be sealed and will assume more and more of its proportional counteracting force, yet the total surface at the sliding pressure side of the ring will not be unduly increased.

The static pressure side 12 also is provided with at least one corner-positioned flexible lip 13 and, in the form shown in FIG. 2, has a pair of static pressure sides 12 in outwardly opposed relation, each of the static pressure sides 12 having a pair of corner-positioned flexible lips 13. Since the sliding pressure side 11 in this form is disposed between the two static pressure sides 12, the latter will each have a lip 13 in common with the sliding pressure side 11. Since my sealing ring may be employed either externally or internally of a moving part, such as, for example, on the outside of a piston or on the inside of a cylinder (not shown), it is convenient to duplicate the parts of the sliding pressure side as well as the parts of the static pressure sides 12. Thus, the sealing effect will be the same in the configuration of FIG. 2 whether the sliding pressure side functions at the left or right of the figure.

Another feature of my invention resides in the static pressure side 12 which has at least the one corner-positioned sealing lip 13 and a relatively larger and stiffer humped member such as bumper portion 20, as shown. The bumper portion 20 may be forced with a flat surface 21 lying substantially in, or somewhat outwardly of, a plane which includes the noses 14 of the corner-positioned sealing lips 13. A shallow groove 22 is interposed between the bumper 20 and each of the lips 13 to permit the lips 13 to flex easily and to force the lips outwardly into a firm seal under fluid pressure. When static pressure is applied to the bumper 20, the ring builds up a rapid resistance and distorting forces are transmitted throughout the entire body of the ring. There is a tendency for the lips 13 to bulge outwardly in a direction lateral to the force applied to the bumper 20 to increase the frictional sealing quality between the ring and the sliding surface. In no event, however, will the ring be crushed, nor will the lips 13 distort so as to permit leakage of fluid, which, once started, will continue to cause trouble. The bumper 20 of one static pressure side 12 serves to transmit the sealing force to the lips 13 associated with the opposite static pressure side 12. As pointed out previously, the lips 13 associated with the same bumper will be protected against folding or crushing. Under dynamic sealing conditions, when the relatively moving surface reverses its direction, the second bumper will take over, protecting its own lips 13 and transmitting sealing force to the opposite lips. Since there are no deeply cut grooves or recesses, the ring 10 will neither crush nor twist during use.

In some instance, I may desire to increase the flexibility of the lips 13 and ribs 17 to give, for example, increased sealing properties at very low pressures, while still maintaining the character of the seal which will operate efficiently at high pressures. To this end, the cross sectional configuration may take the appearance of FIG. 3, wherein the nose 23 of lips 13 and nose 24 of rib 17 have been sharpened by reducing the radius of curvature thereof, as shown. Bumpers 20 and the shallow grooves 18 and 22 maintain their same character, however, and the previously noted sealing effect without crushing or folding the material, is maintained in the alternate form as well as in the first mentioned form.

Referring now to FIG. 4, the static pressure side 12 is the same as that of FIG. 2, but the sliding pressure side has been changed as indicated at 25. Thus, the rib conformation has been eliminated and replaced with a wide and shallow trough 26 which will serve to retain lubricating fluid but is not of such a depth as to permit crushing of the ring under high operating pressures. It will be noted that the cross-sectional configuration is still generally rectangular and that a considerable cross-sectional area of the ring body remains for resisting distortion.

Referring now to FIGS. 5 and 6, a still further form of the invention is shown wherein the sliding pressure sides 27 correspond to the sliding pressure sides 11 of the first mentioned form and the static pressure side 28 conforms to the static pressure side 12 of the first form. The entire configuration, however, has been rotated 90° and the bumpers 29 and 30 lie respectively at the outer and inner circumferences of ring segment 31, as shown in FIG. 5. The sliding pressure sides 27, as shown in FIG. 6, now lie in parallel planes at the sides of the ring and are especially adapted for use with sliding or rotating plates or valves wherein the movement occurs at the flat side of the ring rather than at the outer or inner circumference. The bumpers 29 and 30 have the same function as previously noted in transmitting force and preventing folding or crushing of associated lips 32.

Because my seal ring does not unduly distort under pressure the break-away force required for initiating movement of the ring against a sliding surface remains virtually constant over a wide range of pressures as evidenced by the following table. Comparative break-away forces are shown for the best available prior art sealing ring wherein distortion and flexibility are not controlled as in the manner disclosed herein.

| Static Pressure, Lbs. per Sq. Inch | Conventional Non-Bumper Type Seal Ring Break-Away Force, Lbs. | Bumper-Type Seal Ring Break-Away Force, Lbs. |
|---|---|---|
| 0 | 14 | 11 |
| 100 | 16 | 12 |
| 200 | 18 | 15 |
| 300 | 21 | 17 |
| 400 | 24 | 20 |
| 500 | 27 | 20 |
| 600 | 28 | 20 |
| 700 | 29 | 20 |
| 800 | 30 | 20 |
| 900 | 31 | 20 |
| 1,000 | 32 | 20 |

Because of the low degree of distortion present in my design, compression set is less of a problem and, hence, a harder rubber may be employed in my invention. A harder rubber, in turn, minimizes friction and, hence, accentuates the advantages which accrue from the corner lip and intermediate hump arrangement in the seal ring of the instant invention.

In all of the forms of the invention herein disclosed, it will be noted that the flexible corner-positioned lips, intermediate humped portions and intervening shallow oil-retaining grooves or troughs are employed. It is to be understood, however, that, while my ring structure has been illustratively described in connection with its functions associated with dynamic (reciprocating and rotating) sliding movement, it serves admirably well without change in structure for purely static seals between secured members designed to retain or prevent passage of fluid. In such static seals, the flexible corner lips and provision against folding and crushing are also important though the respective contiguous sides are not, in such cases, distinguished as "sliding" or "static."

It will, of course, be understood that various changes may be made in the form, details, arrangements, and proportions of the parts without departing from the scope of my invention as set forth in the appended claims.

What I claim is:

1. A resiliently distortable seal ring having an annular body which, in cross section, comprises, a medial body area having a sliding pressure side and a contiguous static pressure side angulated with respect thereto, said sliding pressure side having a pair of divergently angulated corner-positioned sealing lips adapted to flexibly engage a sliding surface in sealing engagement and said static pressure side having one of said corner-positioned sealing lips in common therewith and a bumper portion lying in laterally spaced relation thereto and defining an intermediate shallow groove structure, said bumper portion having a relatively greater mass of material and presenting an outwardly facing surface adapted to statically engage a confronting pressure surface, whereby said bumper portion during use will absorb the greater amount of compressive force and permit the lips to function freely under pressure without folding or crushing.

2. A resiliently distortable seal ring having an annular body which, in cross section, comprises, a medial body area having a sliding pressure side and a contiguous static pressure side angulated with respect thereto, said sliding pressure side having a pair of divergently angulated corner-positioned sealing lips adapted to flexibly engage a sliding surface in sealing engagement, a shallow oil-retaining trough intermediate the pair of corner-positioned sealing lips at the sliding pressure side, and said static pressure side having one of said corner-positioned sealing lips in common therewith and a bumper portion lying in laterally spaced relation thereto and defining an intermediate shallow groove structure, said bumper portion having a relatively greater mass of material and presenting an outwardly facing surface adapted to statically engage a confronting pressure surface whereby said bumper portion during use will absorb the greater amount of compressive force and permit the lips to function freely under sliding pressure while preventing folding and crushing thereof.

3. A resiliently distortable seal ring having a generally rectangular cross section including a pair of outwardly opposed static pressure sides and a sliding pressure side extending from one of the static pressure sides to the other, each of said static pressure sides having a corner lip in common with said sliding pressure side, said sliding pressure side having a shallow recessed configuration between the corner lips, and said static pressure sides having respective shallow grooves adjacent the corner lips and relatively less distortable bumper portions of greater mass adjacent said shallow grooves, each of said bumper portions having an outwardly facing statically pressure surface, whereby the bumper portions will be convergently compressed during use without causing the corner lips to pinch, crush or lose their effective sealing properties.

4. The structure set forth in claim 3, wherein the static pressure sides are at respective inner and outer circumferential surfaces of said ring.

5. The structure set forth in claim 3, wherein the static pressure sides are annularly formed at the respective sides of said ring and lie in mutually parallel planes.

6. The seal ring of claim 3 wherein each of said static pressure sides is provided with a second corner lip in divergently angulated relation to said corner lip in common with said sliding pressure side.

7. The seal ring set forth in claim 1 wherein the bumper portion extends outwardly at least as far as said one corner-positioned lip.

8. The seal ring set forth in claim 3 wherein each of the bumper portions extends outwardly at least as far as said corner-positioned lip in common with said sliding pressure side.

References Cited in the file of this patent
UNITED STATES PATENTS 2,481,429   McCuistion _____ July 1, 1958
2,983,533   Tisch _____ May 9, 1961

UNITED STATES PATENT OFFICE
CERTIFICATE OF CORRECTION

Patent No. 3,052,478                        September 4, 1962

Wells J. Horvereid

It is hereby certified that error appears in the above numbered patent requiring correction and that the said Letters Patent should read as corrected below.

Column 1, line 49, for "from" read -- form --; column 2, line 66, for "druing" read -- during --; column 3, line 29, for "forced" read -- formed --; line 55, for "instance" read -- instances --.

Signed and sealed this 1st day of January 1963.

(SEAL)
Attest:

ERNEST W. SWIDER
Attesting Officer

DAVID L. LADD
Commissioner of Patents